(12) United States Patent
Vissapragada (10) Patent No.: US 7,555,645 B2
(45) Date of Patent: Jun. 30, 2009

(54) REACTIVE AUDIT PROTECTION IN THE DATABASE (RAPID)

(75) Inventor: Rama Vissapragada, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 889 days.

(21) Appl. No.: 11/031,052

(22) Filed: Jan. 6, 2005

(65) Prior Publication Data

US 2006/0156379 A1 Jul. 13, 2006

(51) Int. Cl.
*G06F 9/00* (2006.01)
(52) U.S. Cl. ...................................... 713/166; 713/168
(58) Field of Classification Search .................. 713/164, 713/166
See application file for complete search history.

(56) References Cited

U.S. PATENT DOCUMENTS 6,430,561 B1 * 8/2002 Austel et al. .................... 707/9

OTHER PUBLICATIONS

Oracle Corporation (1999) "Database Security in Oracle8i," an Oracle Technical White Paper, Nov. 1999, published online Feb. 10, 2003, located at: <http://ww_w.oracle.com/technology/deploy/security/pdf/oow99/dbswp86.pdf>.
Oracle Corporation (2003), "Oracle Database 10g Security and Identity Management," An Oracle White Paper, Dec. 2003, Published online Feb. 17, 2004, located at: <http://www.oracle.com/technology/deploy/security/pdf/twp_security_db_securityoverview_10r1_1203.pdf#search='Oracle%20Database%2010g%20Security%20and%20Identity%20Management'>.
Pinkett, Fred, "Automating System Security Audits," IT Audit, The Institute of Internal Auditors, vol. 6, Jun. 1, 2003, pp. 1-2.
Turner, Tom, "Securing the Database: What are the Issues?" IT Audit, The Institute of Internal Auditors, vol. 2, Sep. 15, 1999, pp. 1-3.

* cited by examiner

*Primary Examiner*—Thomas Peeso
(74) *Attorney, Agent, or Firm*—Hickman Palermo Truong & Becker LLP

(57) ABSTRACT

A method for proactively enforcing security in a computer system is provided. A plurality of security modification rules is stored for a system. A set of conditions is associated with each security modification rule. Based on one or more audit records generated for the system, the system determines whether the set of conditions associated with any security modification rule has been satisfied. If the system determines that the set of conditions associated with a particular security modification rule has been satisfied, then the system performs an action that modifies one or more security parameters associated with the system, where the action is associated with the violated security modification rule.

64 Claims, 4 Drawing Sheets

REACTIVE AUDIT PROTECTION IN THE DATABASE (RAPID)

FIELD OF THE INVENTION

The present invention relates to computer system security. The invention relates more specifically to proactively enforcing security rules and policies in a computer system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most computer systems nowadays are secured by requiring authentication of their users before allowing the users to access information or services provided by the systems. Many computer systems also provide enhanced security by actively monitoring the activities of their users, and by limiting or restricting the services or information provided to the users based on their identity. For example, a user of a computer system may initially be granted access to the system by creating a username associated with the user, and by allowing the user to set up a secret password.

The system administrator creating the username also associates a set of privileges with the username. A privilege is a grant to the user to perform a particular operation in the system. For example, in a database system, the set of privileges associated with the user may include the privileges to perform operations related to selecting, updating, and/or deleting information from a database managed by the database system.

In some systems, the system administrator creating the username may also associate a set of permissions with the username. A permission is a grant to the user to access a particular object in the system or a particular service provided by the system. Using a database system as an example, a set of permissions associated with a user may include permissions granted to the user to access the information stored in a particular database, in a particular table in the database, or in a particular column or columns in a table. In every computer system, privileges and permissions granted to a user may be denied or revoked by an authorized user of the system, usually a system administrator.

Some computer systems are further secured by providing one or more roles that a user of the system may perform. In these systems, a set of predefined privileges and/or a set of predefined permissions are associated with each role, and once a username representing a user in the system is associated with a role, the user is automatically allowed to perform the operations associated with the set of predefined privileges and to access the objects associated with the set of predefined permissions. For example, a user in a database system may perform the role of a system administrator, which role is granted the privilege to perform all operations in the database system and the permission to access all objects in all databases managed by the database system; or the user in the database system may perform the role of a database owner, which role is granted the privilege to perform all operations in a particular database and the permission to access all objects in the database.

In some computer systems, in order to simplify the maintenance of security, users may be congregated into user groups. In these systems, privileges and/or permissions may be granted and denied to the user groups instead of the individual users. In other computer systems, in order to make administration of security more efficient, a set of security policies may be defined. A security policy is a predefined set of privileges and/or permissions that are associated with a predefined user, user group, user role, or one or more objects in the system.

In addition to security mechanisms, many software systems have audit mechanisms. In general, audit mechanisms capture information about the activities of a system's users. What particular activities are to be audited is usually determined by a set of audit rules, where an audit record is generated when a condition associated with an audit rule is satisfied. For example, when a user connects to a system and creates a session to utilize the services of the system, the system may record in various logs audit information about the user and audit information pertaining to the session the user created. Further, the system may be configured to record, during the lifetime of the session, any audit information about the actions and operations performed by the user.

Usually, the computer systems are configured to collect such audit information in order to give system administrators the ability to perform fine-tuning of system resources, to correct improper system set up, and to plan for future upgrades. System administrators usually perform these tasks by searching through audit records that may be spread across many audit logs and even many computer hosts.

Often, in a computer system there is little interaction between the security mechanism and the audit mechanism. For example, based on information in the audit records, an administrator may decide to change security settings. However, such security settings adjustments typically take place long after the activity that generated the audit records has ceased. Of course, if the system administrator determines that user activity reflected in the audit records is improper, and if the user is still logged on in the system, then the administrator may terminate the user session in the system. However, given the time-consuming analysis that such a decision requires, and the massive amount of concurrent activity in some software systems, the likelihood that an administrator can stop a security threat "in the act" is extremely low.

Based on the foregoing, there is clearly a need for techniques for proactively enforcing security rules in computer systems that overcome the shortcomings of the approach described above. Also needed are techniques for combining and integrating audit rules and security rules to close existing security loopholes that may be exploited by users that engage in unauthorized activities.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

System Overview

Figure 1A:
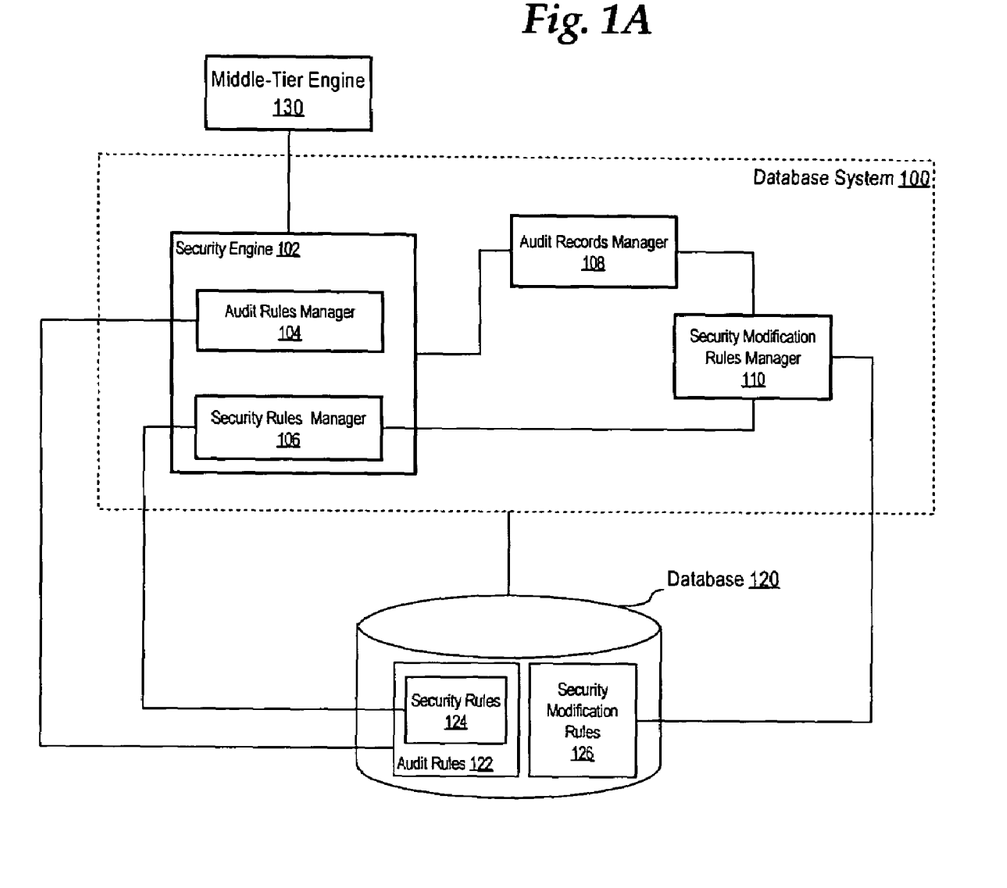
FIG. 1A is a block diagram that illustrates a database system upon which one embodiment of the invention may be implemented.

FIG. 1A is a block diagram that illustrates a database system upon which an embodiment of the invention may be implemented. FIG. 1A is to be viewed in illustrative rather than restrictive sense, because the present invention may be implemented on any computer system that uses a database as a repository for its data.

Depicted in FIG. 1A are middle-tier engine 130, database system 100, and database 120. Middle-tier engine 130 is operatively and/or communicatively coupled to database system 100, and represents a middle-tier component between the database system and the client applications that the database system services. In the embodiment depicted in FIG. 1A, middle-tier engine 130 receives requests to execute database commands from client applications, and sends the requests to database system 100 for execution. In a different embodiment, client applications connect directly to database system 100, and middle-tier engine 130 is not necessary to provide intermediary services.

Database system 100 is operatively and/or communicatively coupled to middle-tier engine 130, and manages information stored in one or more databases, such as database 120. Database system 100 includes, among other components, security engine 102, audit records manager 108, and security modification rules manager 110.

Security engine 102 is communicatively coupled to middle-tier engine 130, audit records manager 108, and security modification rules manager 110. Security engine 102 is configured to perform various security and audit checks on a database command before the database command is to be executed, and includes audit rules manager 104 and security rules manager 106.

Audit rules manager 104 is communicatively coupled to database 120, and manages audit rules repository 122 that is stored in the database. Audit rules manager 104 maintains, based on input received from a user, a set of audit rules stored in audit rules repository 122. Based on the set of audit rules stored in audit rule repository 122, audit rules manager 104 also determines whether an audit record needs to be created for a database command that is received from middle-tier engine 130.

Security rules manager 106 is another component of security engine 102. Security rules manager 106 is communicatively coupled to database 120 and manages security rules repository 124 that is stored in the database. Security rules manager 106 receives user input, and based on the input, creates and maintains a set of security rules that is stored in security rule repository 124. Security rules manager 106 is further operatively coupled to security modification rules manager 110, and is configured to receive input from the security modification rules manager. Based on the input, security rules manager 106 may change one or more parameters associated with one or more security rules, or may change one or more security parameters of database system 100. In one embodiment, security rules manager 106 may also be operatively coupled to audit rules manager 104, and can request a modification of one or more audit rules based on the input received from security modification rules manager 110.

Audit records manager 108 is communicatively coupled to security engine 102 and performs logging of audit records in response to security engine 102 determining that audit records need to be generated for a database command submitted for execution. Audit records manager 108 is also communicatively coupled to security modification rules manager 110, and is configured to notify the secondary rules manager when an audit record has been generated.

Security modification rules manager 110 is communicatively coupled to audit records manager 108 and to security rules manager 106. Security modification rules manager 110 is also communicatively coupled to database 120, and maintains a set of security modification rules that are stored in security modification rules repository 126. Based on one or more audit records generated by audit records manager 108, security modification rules manager 110 determines whether any security modification rule has been triggered. A security modification rule may be triggered for example, when conditions associated with the security modification rule are satisfied by the audit records. If a security modification rule has been triggered, then security modification rules manager 112 notifies security rule manager 108 that one or more security parameters associated with database system 100 need to be modified.

Database 120 includes audit rules repository 122, security rules repository 124, and security modification rules repository 126. In the embodiment depicted in FIG. 1A, the set of security rules stored in security rules repository 124 is a subset of the audit rules stored in audit rules repository 122. However, in a different embodiment, the security rules may not be a subset of the set of audit rules, and accordingly may be stored in a repository that is separate from audit rules repository 122.

In operation, a plurality of security modification rules are stored in security modification rules repository 126, where a set of conditions is associated with each security modification rule. A security modification rule is said to be satisfied, or triggered, when the set of conditions associated with the rule is satisfied.

Middle-tier engine 130 receives a request from a client application to execute a database command, and passes the request to database system 100. Security engine 102 then determines, by utilizing audit rules manager 104 and security rules manager 106, whether audit records need to be generated for the database command. If security engine 104 determines that audit records need to be generated, it notifies audit records manager 108, and the audit records manager then generates one or more audit records. Based on the generated audit records, security modification rules manager 110 determines whether all of the conditions associated with any security modification rule have been satisfied. If all of the conditions associated with a particular security modification rule have been satisfied, then security modification rules manager 110 requests security rules manager 106 to modify one or more security parameters of database system 100.

In an embodiment, the security engine may include, as its own components, the audit records manager and the security modification rules manager. Alternatively, the functions performed by the audit records manager may instead be provided by a standard software component that performs audit record management for the entire database system. In one embodiment, the security engine, the audit records manager, and the security modification rule manager may be executed as a separate service to provide security services to more than one database system that includes the security rule manager.

Figure 1B:
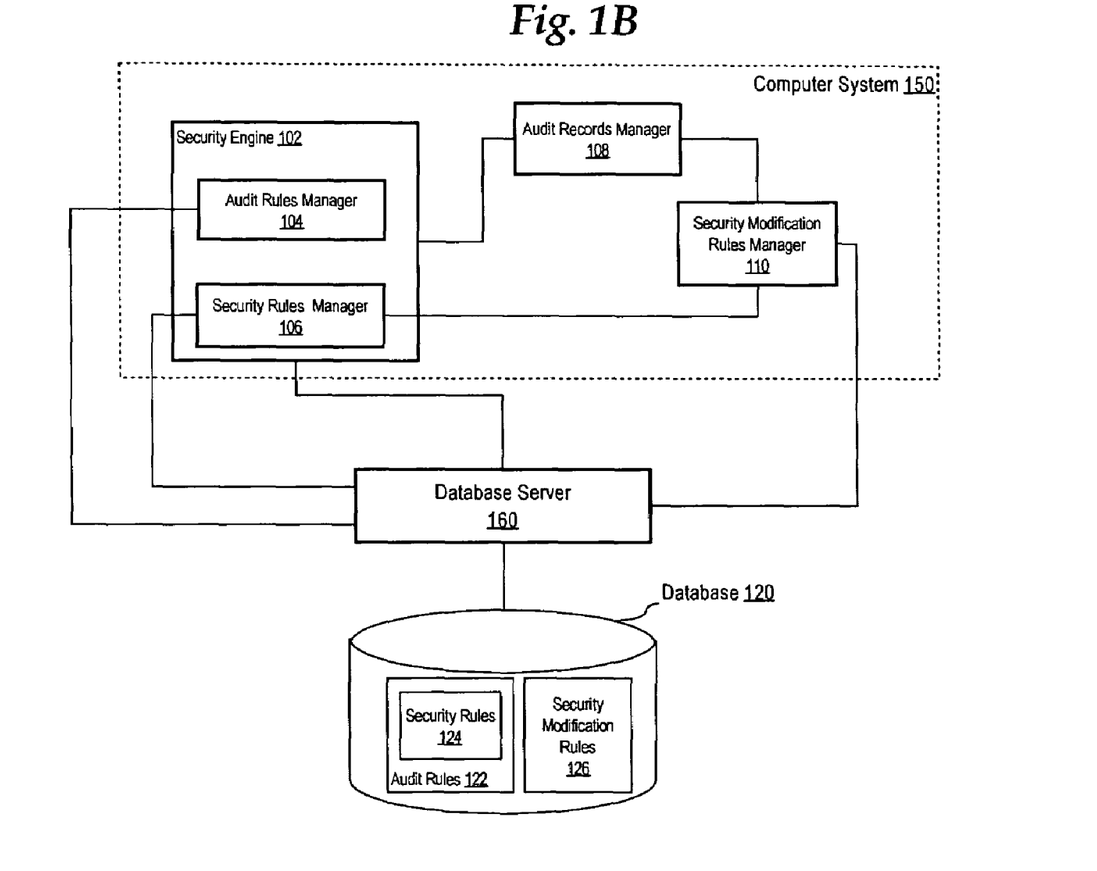
FIG. 1B is a block diagram that illustrates a computer system upon which another embodiment of the invention may be implemented.

In the embodiment depicted in FIG. 1B, security engine 102, audit records manager 108, and security modification rules manager 110 are implemented as software components that are part of general computer system 150. Computer system 150 and/or its components are communicatively coupled to database server 160. Database server 160 manages information in one or more databases, such as database 120. In this embodiment, computer system 150 keeps its security rules repository 124, audit rules repository 122, and security modification rules repository 126 in database 120. Database server 160 manages access to the rule repositories in database 120 on behalf of computer system 150.

Functional Overview

In a method for proactively enforcing security in a computer system, a plurality of security modification rules is stored in the system. Each security modification rule is associated with a set of conditions. After one or more audit records are generated for the system, the system determines whether the set of conditions associated with any security modification rule has been satisfied. If the set of conditions associated with a security modification rule has been satisfied, then an action that modifies one or more security parameters associated with the system is performed, where the action is associated with the security modification rule. In this way, the security modification rules are used for the provision of feedback to the system to facilitate a determination of whether the existing security state of the system may be tightened or relaxed.

In one embodiment, the computer system on which the techniques described herein may be implemented is a database system. However, the techniques described herein may be implemented on any software system including, but not limited to, an operating system, a remote-access server, a web server, a firewall application, and an e-mail server.

Figure 2:
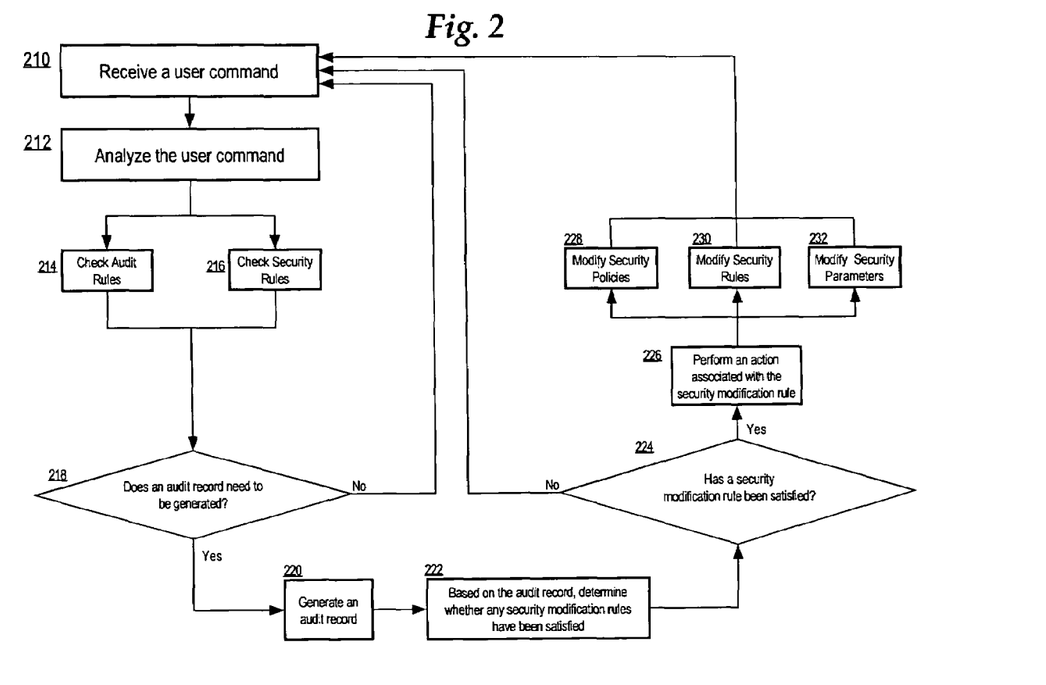
FIG. 2 is a flow diagram that illustrates a process for proactively enforcing security in a system, wherein the process comprises a technique under one embodiment of the invention.

FIG. 2 is a flow diagram that illustrates a process for proactively enforcing security in a computer system, where the process comprises a technique under one embodiment of the invention. In Step 210 the system receives a user command. In Step 212, the user command is analyzed to determine whether it raises any security concerns.

In Step 214, based on the information included in the user command, the system checks whether any audit rules stored for the system have been triggered. In addition to, or instead of, performing Step 214, the system may perform Step 216, in which, based on the information included in the user command, the system checks whether any security rules stored for the system have been violated. Based on the checks performed in Steps 214 and/or 216, the system determines whether an audit record needs to be generated in response to the user command. If in Step 218 the system determines that no audit record needs to be generated, then no further security-related action is undertaken, and the system proceeds with receiving and analyzing the next user command.

If in Step 218 the system determines that an audit record needs to be generated, then in Step 220 the system generates an audit record. In Step 222, based on the audit record, the system determines whether the set of conditions associated with any security modification rule has been satisfied. If in Step 224 it is determined that no set of conditions associated with any security modification rule has been satisfied, then no further security-related action is undertaken, and the system proceeds with receiving and analyzing the next user command.

If in Step 224 it is determined that the set of conditions associated with a particular security modification rule has been satisfied, then in Step 226 the system performs an action associated with the security modification rule. The action associated with the security modification rule is generally performed by modifying one or more security parameters associated with the system. Step 228 may, for example, involve modifying one or more security policies in the system. Further, in addition to, or instead of Step 228, Step 230 or Step 232 may be performed. In Step 230, the action performed in response to a security modification rule being satisfied includes modifying one or more security rules. In Step 232, the action performed includes modifying one or more general security parameters that are not necessarily associated with any security policy or rule.

Once the action associated with the security modification rule has been performed, the system proceeds to receive and analyze another user command. In a different embodiment, once the action associated with a security modification rule has been performed, and one or more security parameters associated with one or more security rules have been modified, the system proceeds by analyzing the same user command. Steps 212 to 232 are performed again to determine, under the current state of the security rules, whether it is safe to execute the user command or whether further actions associated with the same and/or another security modification rule must be performed.

Other Embodiments of the Present Invention

In an embodiment, security rules and audit rules in a computer system are combined to provide integrated security in a computer system. During operation, the system detects an attempt to execute an operation that is governed by a particular security rule. If the security rule is such that audit records for it are automatically generated, then the system automatically generates one or more audit record. Based on the audit record, the system may then perform an action that modifies one or more security parameters of the system. The one or more security parameters may or may not be associated with the particular security rule that has been violated.

For example, a software system may be configured to perform a virus scan of each executable file before the file is executed. A security rule may be defined which requires that an audit record be created if a virus in such file is found. If an audit record is created indicating that a particular executable file contains a virus, then based on the audit record the system may modify one or more security parameters to indicate that a virus scan must be performed on any file before the file is loaded in memory. In this example, the one or more modified security parameters are associated with the particular rule.

In a different example, a security rule may be defined which requires that an audit record be created if any computer virus is found in any file managed by a software system. If an audit record is created indicating that a file in the system contains a virus, then based on the audit record, the system may be required to terminate all active user sessions in order to prevent a possible spread of the virus. In this example, in order to terminate all active user sessions, the software system necessarily modifies one or more security parameters related to the files and objects being used by the active user sessions, but the one or more security parameters are not associated with the particular security rule that has been violated.

In another embodiment, security rules and audit rules in a software system are integrated to provide for a fine-grained security. A user is allowed to specify one or more security rules for the system by using an Application Programming Interface (API). The system receives a call from the API that indicates a particular security rule, and a parameter that indicates whether or not audit records should be generated by the system automatically in response to operations that are governed by the particular security rule. If the parameter indicates that audit records should not be generated, then the system only checks whether subsequent user operations violate the particular security rule. If the parameter indicates that audit records should be generated, then in response to a user operation that is governed by the security rule the system generates one or more audit records. The audit records may be generated if, or regardless of whether, the user operation violates the security rule. Based on the one or more audit records, the system then performs an action that modifies one or more security parameters associated with the system.

Determining a Violation of a Security Modification Rule Based on One or More Audit Records In an embodiment, based on one or more audit records, a system may determine whether the conditions associated with any security modification rule stored for the system have been satisfied. The system may make this determination in response to, and/or immediately after, the generation of an audit record. The system may also make this determination in response to the expiration of a predefined interval of time. For example, a system administrator may schedule a recurring task, where the system every hour identifies all audit records generated within the last hour, and checks to see whether the conditions associated with any security modification rule have been satisfied. In another example, the system may be configured to check whether any security modification rules have been satisfied at a predetermined time of the day, like, for example, midnight.

In an embodiment, a system may determine whether the set of conditions associated with any security modification rule has been satisfied based on a plurality of audit records that were generated at different times. For example, a database system may determine that a security modification rule has been violated in response to detecting that in the last 24 hours multiple audit records were generated that indicate that multiple unauthorized attempts have been made to access a column in a table that contains sensitive information, such as, for example, employee salary data.

Security Modification Rules

In one embodiment, a set of security modification rules is provided in a system to facilitate the implementation of the techniques described herein. Each rule in the set of security modification rules is associated with a set of conditions. In addition, each rule may be associated with one or more security parameters, where the values of the one or more security parameters control one or more security settings of the system. Further, each rule may be associated with one or more security rules or security policies of the system, where if the system determines that a security modification rule has been triggered, then the system performs an action that modifies the security rule or the security policy that is associated with the violated security modification rule.

For example, in a database system, a security modification rule may state "if a user that is not authorized to update the Financial_Balance table attempts to update the table, then prohibit any updates in the entire database." In this case, the condition associated with the rule is an attempt by an unauthorized user to update the Financial_Balance table. When this condition is satisfied and an audit record is created in response to the unauthorized attempt, based on the audit record the database must perform the action of prohibiting all updates in the database that contains the Financial_Balance table. The database system performs this action by setting to TRUE the READ_ONLY security parameter associated with the database, thus setting the database in read-only mode.

In another example, in a database system, a security modification rule may state "if a user that is not authorized attempts to read data from the Financial_Balance table, then prohibit any roles with which the user is associated from reading any table in the database." In this case, the security modification rule is associated with the security rules governing access to the database by various roles defined in the system. If the conditions associated with the security modification rule are satisfied, i.e. an unauthorized user attempts to read data from the Financial_Balance table, the database system makes a record of this unauthorized attempt. Based on the audit record, the database system then determines the identity of the user and determines to which roles the user belongs. The database system then performs the action of prohibiting all the roles to which the user belongs from reading any data stored in any database object. The database system accomplishes this task by automatically revoking the privilege to read data stored in any database object from all the roles to which the unauthorized user belongs.

In an embodiment, each rule in the set of security modification rules is stored in an eXtensible Markup Language (XML) format. If the system implementing the techniques described herein is a database system, then the set of conditions associated with each security modification rule may be stored as one or more SQL predicates. Each SQL predicate may evaluate to a Boolean value. Further, the one or more SQL predicates may be composed of more than one subpart, where the subparts are joined with a logical operator and the aggregation of the subparts evaluates to a Boolean value. The evaluation of a SQL predicate is based at least in part on information included in one or more audit records generated for the database system. In addition to XML format and SQL predicates, the security modification rules may be stored in any format including, but not limited to, plain text, HyperText Markup Language (HTML), character-delimited format, name-value pairs, fixed-width text, and spreadsheet format.

Generating and Storing Audit Records

In one embodiment, one or more audit records generated for a system are used in making a determination of whether the set of conditions associated with any security modification rule has been satisfied. The audit records may include a wide variety of information including, but not limited to, information related to one or more operations performed by user of the system, information related to a session created by a user in the system, information associated with the identity of a user that has created a session in the system and has performed one or more operations, and information about objects in the system that the user has accessed. Further, the audit records may be generated in a particular system in response to request from other software systems. For example, a database system may be used to store the audit records of a network firewall. In this example, the audit records in the database system may be generated in response to activities occurring in the network firewall, and the database system may use the information in such audit records to determine whether any security rule associated with the database system has been violated.

In another example, in response to a user opening a session in a database system, audit records may be created that contain information about the time the session was created, the terminal or computer host from which the session was created, and information about resources (such as amount of memory, type and number of locks, and processor time) allocated to the session. Further, audit records may include information about the identity of a user, and any number of parameters related to the user identity including, but not limited to, the time the user connected to the database system, the network address of the user, the protocol used to connect to the system, and the operating system running on the computer host from which the user connected to the database system. Moreover, in some embodiments, the user need not be a human person, but may be any computer process including, but not limited to, a backup process, a background process, a particular thread of a process, and an automated information distribution service.

In another example, the information stored in audit records may include any information related to the activities of a user in a system. Depending on the type of the system, the activities of the user may include a wide variety actions including, but not limited to, performing one or more operations, completing one or more transactions, sending one or more messages or e-mails, accessing one or more resources, changing one or more system parameters (including security-related parameters), accessing one or more objects in the system, and any combination of the actions mentioned herein. The set of the audit records related to the activities of a user represents an audit trail from which a full picture of the user's activities may be reconstructed. Based on the information in such audit trail, the system may be able to enforce one or more security rules, or may check whether one or more security modification rules have been violated.

The audit records may be stored temporarily in memory, or may be stored in any computer-readable medium including, but not limited to, electromagnetic hard disks, optical disks, storage/backup tapes, and portable mass-storage devices. In addition, the audit records generated by a system may be stored in a repository. The repository may be local to the system, that is, the repository is stored on the same computer host on which the system is running. The audit records repository may also be stored on a remote computer host. Furthermore, the repository of audit records may be organized in a variety of ways including, but not limited to, one or more databases, one or more tables in one or more databases, one or more operating system files, one or more directories of operating system files, and any combination thereof.

Restricting and/or Relaxing Security Over User Activities

In one embodiment of the present invention, if a set of conditions associated with a security modification rule has been satisfied, the system performs an action associated with the security modification rule, which action modifies one or more security parameters associated with the system. The action performed when a security modification rule has been triggered may increase one or more security restrictions. For example, if a particular security modification rule has been triggered, the system may increase security restrictions by revoking from a user a permission he previously had to access an object in the system.

The system may perform an action that comprises increasing security restrictions by changing the value of a security parameter associated with the system. Subsequently, the system may continue using the same changed value (that enforces increased security restrictions) until a user that is authorized to enforce security in the system changes the security parameter back to its original value. Alternatively, or in addition to, the system may change the security parameter back to its original value in response to an expiration of a timer, and/or in response to the closing of the session that initiated the operation that prompted the system to increase security restrictions.

For example, a security modification rule in a database system may require that "if a first user attempts to grant to a second user a privilege that the first user is not authorized to grant, then the first user is stripped of all previously granted privileges." If user A, who is not authorized to grant access to the Employee_Salaries table, attempts to grant to user B the privilege of performing an UPDATE operation on the table, the rule will be violated and an audit record will be created. In response to the creation of the audit record, the system will automatically revoke all privileges granted to user A, and thus user A will not be able to perform any operations in the database system. Thereafter, depending on the configuration of the database system, user A may not have the privilege of performing any operations in the database system until a system administrator manually grants him or her back the privileges. Alternatively, the database system may be configured to only temporarily revoke the privileges granted to user A, and the revocation may expire when the user A closes the session during which he or she attempted to grant the UPDATE privilege to user B.

In a different embodiment, if a system determines that a security modification rule has been violated, a system may be configured to decrease or relax one or more security restrictions that are controlled by the values of one or more security parameters. This capability may be useful when enforcing too tight security restrictions leads to severe degradation in the performance of the system. For example, a security modification rule may be created for a database system requiring that "if more than 1000 audit records related to security violations were recorded in the last 300 seconds, then allow all read-only operations to proceed". If the conditions associated with this rule are satisfied, then the database system may perform an action that modifies the security parameters associated with any subsequent read-only operation in such a way as to permit the read-only operation to proceed despite the fact that another security modification rule may have been triggered.

Types of User Activities that May be Restricted

If, based on an audit record, a system determines that a security modification rule has been triggered, the system performs an action that modifies one or more security parameters, where the action is associated with the triggered security rule. The action performed by the system may comprise any type of security-related action including, but not limited to, restricting a particular activity in the entire system, restricting a particular activity in a session that was created by a user that performed an operation causing the generation of the audit record, restricting a particular activity of the user that caused the generation of the audit record, restricting a particular activity of a role to which the user belongs, auditing a particular activity of a user, auditing the activities of all user belonging to the same role as the user that caused the generation of the audit record, terminating a session created in the system by the user that caused the generation of the audit record, and preventing a user from accessing a set of data which set of data the user was previously permitted to access.

For example, a user may perform a particular activity in a database system, where the activity comprises of one or more SELECT, UPDATE, or DELETE operations, or any combination thereof. If the database system determines, based on an audit record, that the user tried to update data in a table without having the proper permissions to perform an update on the table, then the database system may revoke this user's UPDATE privileges in the entire database, may revoke the UPDATE privileges from any roles to which the user belongs, may terminate the connection over which the user issued the unauthorized request, or may terminate the user session. Further, the database system may revoke the SELECT privileges from the user in the entire database, so that the user will no longer be able to read any data stored in any object in the database. After the database system has automatically revoked a particular privilege from the user, the user may gain back the particular privilege only if an administrator of the system manually grants back the privilege to the user.

Security Parameters and Scope of Restrictions

In one embodiment, if a security modification rule has been triggered and an audit record of the violation has been generated, the system performs an action that modifies one or more security parameters associated with the system. The security parameters may be any security parameters in the system including, but not limited to, parameters associated with the user that caused the generation of the audit record, parameters representing a privilege granted to the user, parameters representing permissions associated with one or more object that the user has attempted to access, parameters associated with a group of users which includes the user that caused the generation of the audit record, and parameters associated with a session created by a user in the system.

For example, if a security modification rule in a database system has been triggered and an audit record of the violation has been generated, then the database system may automatically determine the identity of the user, and may revoke from the user the privilege to perform update operations, may revoke the permissions the user has to access any database tables, may revoke any privileges granted to a group of users to which the user belongs, or may terminate the session created by the user in the database.

In an embodiment, a system may perform an action modifying one or more security parameters associated with all users in the system. For example, in response to the generation of an audit record that includes information indicating that a user has tried to update a particular table in a particular database, a database system may set the READ_ONLY parameter of the database to TRUE, thus effectively prohibiting all users of the database system from making any updates to any objects in the particular database.

The security parameters, which may be modified by an action performed by a system in response to a violation of a security modification rule, may also be associated with one or more files or directories managed by the system, or with a particular component of the system. For example, the system may be an Operating System (OS) and the security parameters may be an Access Control List (ACL) associated with one or more files or directories managed by the OS. In another example, in response to detecting an attempt by a user to access an object in a database system without having the proper permissions, the database system may modify a parameter in the network component of the database system in order to deny any subsequent connections to the system from the network subnet from which the unauthorized access attempt was initiated. In addition or instead of, the database system may also modify a security parameter of the network component in order to deny all subsequent connections to the database system in order to prevent any possible breach of security.

Implementation Mechanisms

In one embodiment, the techniques described herein are implemented by a database system. In order to implement the techniques, the database system provides a set of formal Structured Query Language (SQL) commands and the data structures necessary to support the execution and processing of these SQL commands. The set of formal SQL commands enables a user of the database system, typically a system administrator, to perform a wide variety of tasks including, but not limited to, configuring parameters in the database system in order to prevent or restrict the activities of a user, restricting the data that a user is allowed to access and view during a session, and destroying a user session. Further, the set of formal SQL commands may include commands to enable the system to actively use recorded audit information, and to check, based on audit information, whether one or more security modification rules have been violated. For example, in performing one of the techniques described herein, the database system determines, based on one or more audit records generated for the database system, whether the set of conditions associated with any security modification rules has been satisfied. A set of formal SQL commands may be provided to perform these steps, e.g., a RETRIEVE_AUDIT_RECORDS(audit_logN, criteriaX) command to retrieve all audit records from audit log "audit_logN" that satisfy criteria "criteriaX", and a CHECK_SECURITY_RULE(security_rule_setM, criteria Y) command to check all rules in security modification rule set "security_rule_setM" that satisfy criteria "criteriaY", where "criteriaY" may be based on information included in one or more audit records retrieved from an audit log.

In an embodiment, a system performs the techniques described herein by making one or more calls to an Application Programming Interface (API). The API may include one or more sets of functions to perform any of the steps of the techniques and methods described herein including, but not limited to, the step of creating and storing a set of security modification rules and the conditions associated with each security modification rules, the step of determining, based on one or more audit records, whether any security modification rules has been violated, and the step of performing an action associated with the violated security modification rule that modifies one or more security parameters of the system.

The techniques described herein may be also implemented by using variety of other software mechanisms including, but not limited to, one or more library of functions, one or more dynamic-link libraries (DLLs), one or more activeX controls, one or more plug-in modules, one or more javabeans, and one or more standalone software applications.

Hardware Overview

Figure 3:
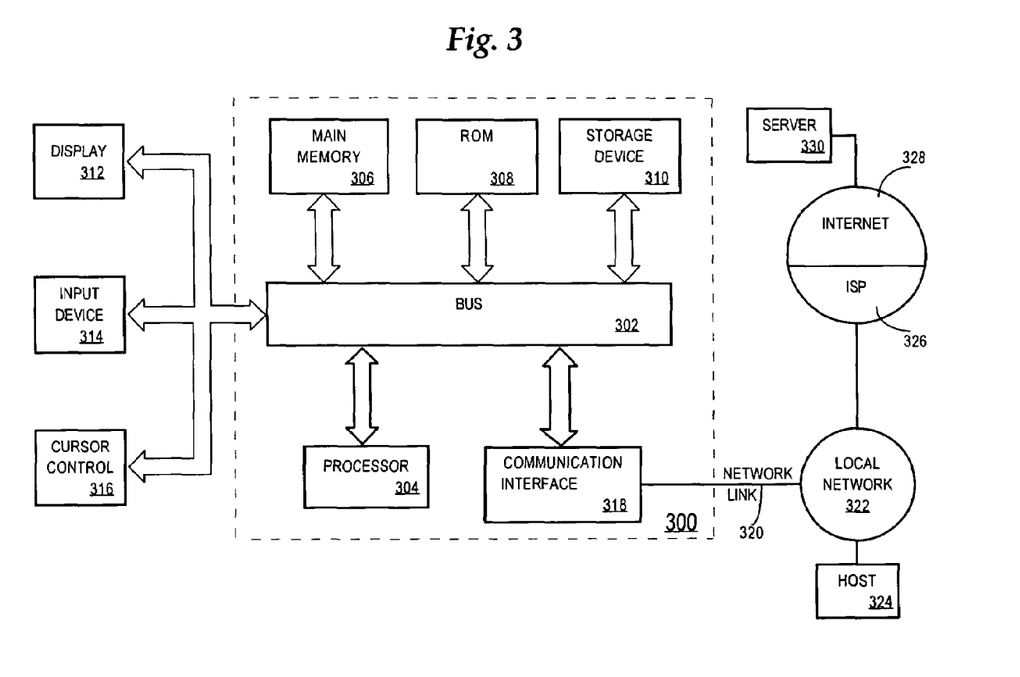
FIG. 3 is a block diagram that illustrates a general computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM)

or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for proactively enforcing security in a computer system, the method comprising the computer-implemented steps of:
   storing a plurality of security modification rules for a system, wherein each security modification rule of the plurality of security modification rules is associated with a set of conditions;
   receiving a command at the computer system;
   analyzing the command to determine whether one or more audit rules are satisfied;
   when the one or more audit rules are satisfied, determining whether one or more audit records need to be generated;
   in response to determining that the one or more audit records need to be generated, generating the one or more audit records;
   based on the one or more audit records, determining whether the set of conditions associated with any security modification rule has been satisfied; and
   in response to determining that the set of conditions associated with a security modification rule of the plurality of security modification rules has been satisfied, performing an action, associated with the security modification rule, that modifies one or more security parameters associated with the system.

2. The method of claim 1, wherein the system is a database system.

3. The method of claim 2, wherein:
   at least one of
   (a) the step of determining whether the set of conditions associated with any security modification rules has been satisfied, and
   (b) the step of performing an action that modifies one or more security parameters,
   is performed by executing one or more Structured Query Language (SQL) commands.

4. A computer-readable volatile or non-volatile medium storing one or more sequences of instructions which, when executed by one or more processors, causes the one or more processors to perform the method recited in claim 3.

5. A computer-readable volatile or non-volatile medium storing one or more sequences of instructions which, when executed by one or more processors, causes the one or more processors to perform the method recited in claim 2.

6. The method of claim 1, wherein:
   at least one of
   (a) the step of storing a plurality of security modification rules,
   (b) the step of determining whether the set of conditions associated with any security modification rules has been satisfied, and
   (c) the step of performing an action that modifies one or more security parameters,
   is performed by making one or more calls to an Application Programming Interface (API).

7. A computer-readable volatile or non-volatile medium storing one or more sequences of instructions which, when executed by one or more processors, causes the one or more processors to perform the method recited in claim 6.

8. The method of claim 1, wherein:
   the step of performing an action includes changing the value of a particular security parameter of the one or more security parameters from a first value to a second value; and
   the method further comprises the step of changing the value of the particular security parameter from the second value to the first value in response to an operation performed by a user that is authorized to enforce security in the system.

9. A computer-readable volatile or non-volatile medium storing one or more sequences of instructions which, when executed by one or more processors, causes the one or more processors to perform the method recited in claim 8.

10. The method of claim 1, wherein:
    the step of performing an action includes changing the value of a particular security parameter of the one or more security parameters from a first value to a second value; and
    the method further comprises the step of changing the value of the particular parameter from the second value to the first value in response to the closing of a session in the system, wherein the session was created by a user that performed an operation causing generation of the one or more audit records.

11. The method of claim 1, wherein the step of performing an action comprises increasing one or more security restrictions that are controlled by the values of the one or more security parameters.

12. A computer-readable volatile or non-volatile medium storing one or more sequences of instructions which, when executed by one or more processors, causes the one or more processors to perform the method recited in claim 11.

13. The method of claim 1, wherein the step of performing an action comprises decreasing one or more security restrictions that are controlled by the values of the one or more security parameters.

14. The method of claim 1, wherein the step of performing an action comprises restricting a particular activity in the entire system.

15. A computer-readable volatile or non-volatile medium storing one or more sequences of instructions which, when executed by one or more processors, causes the one or more processors to perform the method recited in claim 14.

16. The method of claim 1, wherein the step of performing an action comprises restricting a particular activity in a session created in the system by a user, wherein the user performed an operation that caused generation of the one or more audit records.

17. The method of claim 16, wherein the method further comprises:
    in response to receiving input from an administrator of the system, modifying the one or more security parameters based on the input in order to permit unrestricted performance of the particular activity in the session.

18. The method of claim 1, wherein the step of performing an action comprises restricting a particular activity of a user that performed an operation that caused generation of the one or more audit records.

19. A computer-readable volatile or non-volatile medium storing one or more sequences of instructions which, when executed by one or more processors, causes the one or more processors to perform the method recited in claim 18.

20. The method of claim 1, wherein the step of performing an action comprises auditing a particular activity of a user that performed an operation that caused generation of the one or more audit records.

21. The method of claim 1, wherein the step of performing an action comprises terminating a session created in the system by a user, wherein the user performed an operation that caused generation of the one or more audit records.

22. A computer-readable volatile or non-volatile medium storing one or more sequences of instructions which, when executed by one or more processors, causes the one or more processors to perform the method recited in claim 21.

23. The method of claim 1, wherein the step of performing an action comprises preventing a user from accessing a set of data which the user was previously permitted to access, wherein the user performed an operation that caused generation of the one or more audit records.

24. A computer-readable volatile or non-volatile medium storing one or more sequences of instructions which, when executed by one or more processors, causes the one or more processors to perform the method recited in claim 23.

25. The method of claim 1, wherein the one or more security parameters are associated with a user of the system that performed an operation causing generation of the one or more audit records.

26. The method of claim 25, wherein the one or more security parameters represent one or more privileges of the user to perform one or more operations in the system.

27. The method of claim 25, wherein the one or more security parameters represent permissions associated with one or more objects, in the system, that the user has attempted to access.

28. The method of claim 1, wherein the one or more security parameters are associated with a group of users, wherein the group of users includes a user of the system that performed an operation that caused generation of the one or more audit records.

29. The method of claim 1, wherein the one or more security parameters are associated with all users of the system.

30. The method of claim 29, wherein the step of performing an action that modifies one or more security parameters is carried out in response to performing, by a user of the system, an operation that caused generation of the one or more audit records.

31. A computer-readable volatile or non-volatile medium storing one or more sequences of instructions which, when executed by one or more processors, causes the one or more processors to perform the method recited in claim 30.

32. The method of claim 1, wherein the one or more security parameters are associated with a component of the system.

33. The method of claim 1, wherein the one or more security parameters are associated with one or more files managed by the system.

34. The method of claim 1, wherein the step of determining whether the set of conditions associated with any security modification rule has been satisfied is performed at a predetermined time.

35. The method of claim 1, wherein the step of determining whether the set of conditions associated with any security modification rule has been satisfied is performed in response to the expiration of a predetermined interval of time.

36. The method of claim 1, wherein the step of determining whether the set of conditions associated with any security modification rule has been satisfied is performed in response to generation of the one or more audit records.

37. A computer-readable volatile or non-volatile medium storing one or more sequences of instructions which, when executed by one or more processors, causes the one or more processors to perform the method recited in claim 36.

38. The method of claim 1, wherein the one or more audit records include information related to one or more operations performed by a user in the system.

39. The method of claim 1, wherein the one or more audit records include information related to a session in the system, wherein the session is created by a user of the system.

40. The method of claim 1, wherein the one or more audit records include information associated with the identity of a user that has created a session in the system.

41. The method of claim 1, wherein the one or more audit records are stored in a repository.

42. The method of claim 41, wherein the repository is maintained on the same computer host as the system.

43. The method of claim 41, wherein the repository is maintained on a different computer host than the system.

44. The method of claim 41, wherein the repository is organized as a database.

45. A computer-readable volatile or non-volatile medium storing one or more sequences of instructions which, when executed by one or more processors, causes the one or more processors to perform the method recited in claim 44.

46. The method of claim 1, wherein the step of storing a plurality of security modification rules includes storing the plurality of security modification rules in an eXtensible Markup Language (XML) format.

47. The method of claim 41, wherein the repository is organized as one or more operating system files.

48. A computer-readable volatile or non-volatile medium storing one or more sequences of instructions which, when executed by one or more processors, causes the one or more processors to perform the method recited in claim 46.

49. The method of claim 1, wherein:
the system is a database system; and
the set of conditions associated with each security modification rule is represented by one or more Structured Query Language (SQL) predicates.

50. A computer-readable volatile or non-volatile medium storing one or more sequences of instructions which, when executed by one or more processors, causes the one or more processors to perform the method recited in claim 49.

51. A computer-readable volatile or non-volatile medium storing one or more sequences of instructions which, when executed by one or more processors, causes the one or more processors to perform the method recited in claim 1.

52. A method for integrating security rules and audit rules, the method comprising:
during operation of a system, detecting an attempt to execute an operation that is governed by a particular security rule;
determining whether the particular security rule has been identified as a security rule for which audit records are automatically generated; and
if the particular security rule has been identified as a security rule for which audit records are automatically generated, then generating an audit record in response to the attempt to execute the operation.

53. The method of claim 52, wherein the system is a database system.

54. A computer-readable volatile or non-volatile medium storing one or more sequences of instructions which, when executed by one or more processors, causes the one or more processors to perform the method recited in claim 53.

55. The method of claim 52, further comprising:
based on the audit record, performing an action that modifies one or more security parameters in the system.

56. The method of claim 55, wherein the one or more security parameters are associated with the particular security rule.

57. A computer-readable volatile or non-volatile medium storing one or more sequences of instructions which, when executed by one or more processors, causes the one or more processors to perform the method recited in claim 52.

58. A computer-readable volatile or non-volatile medium storing one or more sequences of instructions which, when executed by one or more processors, causes the one or more processors to perform the method recited in claim 55.

59. A method for combining security rules and audit rules, the method comprising:
- exposing an Application Programming Interface (API) through which users can specify security rules for a system; and
- receiving a call from the API, wherein the call indicates a security rule for the system and includes a parameter that indicates whether audit records should be generated by the system automatically in response to operations that are governed by the security rule.

60. The method of claim 59, wherein the system is a database system.

61. A computer-readable volatile or non-volatile medium storing one or more sequences of instructions which, when executed by one or more processors, causes the one or more processors to perform the method recited in claim 60.

62. The method of claim 59, further comprising:
- if the parameter indicates that audit records should be generated, then in response to performing an operation that is governed by the security rule, generating an audit record; and
- based on the audit record, performing an action that modifies one or more security parameters associated with the system.

63. A computer-readable volatile or non-volatile medium storing one or more sequences of instructions which, when executed by one or more processors, causes the one or more processors to perform the method recited in claim 62.

64. A computer-readable volatile or non-volatile medium storing one or more sequences of instructions which, when executed by one or more processors, causes the one or more processors to perform the method recited in claim 59.

* * * * *

UNITED STATES PATENT AND TRADEMARK OFFICE
CERTIFICATE OF CORRECTION

PATENT NO. : 7,555,645 B2  Page 1 of 1
APPLICATION NO. : 11/031052
DATED : June 30, 2009
INVENTOR(S) : Rama Vissapragada It is certified that error appears in the above-identified patent and that said Letters Patent is hereby corrected as shown below:

On Title page, in Item (56), in column 2, under "Other Publications", line 1, delete "ww_w" and insert -- www --, therefor.

In column 9, line 39, delete "electromagnetic" and insert -- electro-magnetic --, therefor.

In column 12, line 35, delete "criteria Y)" and insert -- criteriaY) --, therefor.

Signed and Sealed this

Twentieth Day of July, 2010

David J. Kappos
*Director of the United States Patent and Trademark Office*